United States Patent
Leslie et al.

(10) Patent No.: US 7,367,821 B2
(45) Date of Patent: May 6, 2008

(54) POWER DISTRIBUTION SYSTEM AND A METHOD FOR ASSEMBLING THE POWER DISTRIBUTION SYSTEM

(75) Inventors: Stuart Leslie, Larchmont, NY (US); Roland Zeder, New York, NY (US)

(73) Assignee: Honeywell International, Inc., Morristown, NJ (US)

( * ) Notice: Subject to any disclaimer, the term of this patent is extended or adjusted under 35 U.S.C. 154(b) by 56 days.

(21) Appl. No.: 11/436,408

(22) Filed: May 17, 2006

(65) Prior Publication Data

US 2007/0121266 A1 May 31, 2007

Related U.S. Application Data

(60) Provisional application No. 60/681,737, filed on May 17, 2005.

(51) Int. Cl.
*H01R 25/00* (2006.01)

(52) U.S. Cl. .................................................. 439/121
(58) Field of Classification Search ................ 439/121, 439/211, 120, 119, 110, 94, 651, 652, 535, 439/215, 216; 361/62; 363/142–144, 146, 363/147, 178; 174/480
See application file for complete search history.

(56) References Cited

U.S. PATENT DOCUMENTS

| | | | |
|---|---|---|---|
| 7,128,585 B2 * | 10/2006 | Evilsizer | 439/120 |
| 7,140,922 B2 * | 11/2006 | Luu et al. | 439/651 |
| 7,198,499 B2 * | 4/2007 | Kim et al. | 439/217 |
| 7,201,589 B2 * | 4/2007 | Jong | 439/94 |

* cited by examiner

*Primary Examiner*—Edwin A. Leon

(57) ABSTRACT

A power distribution system and a method for assembling the power distribution system are provided. The power distribution system is configured to be mounted on a wall and to hold a plurality of devices thereon. Further, the power distribution system is configured to supply either an AC voltage or a DC voltage to each of the devices.

9 Claims, 4 Drawing Sheets

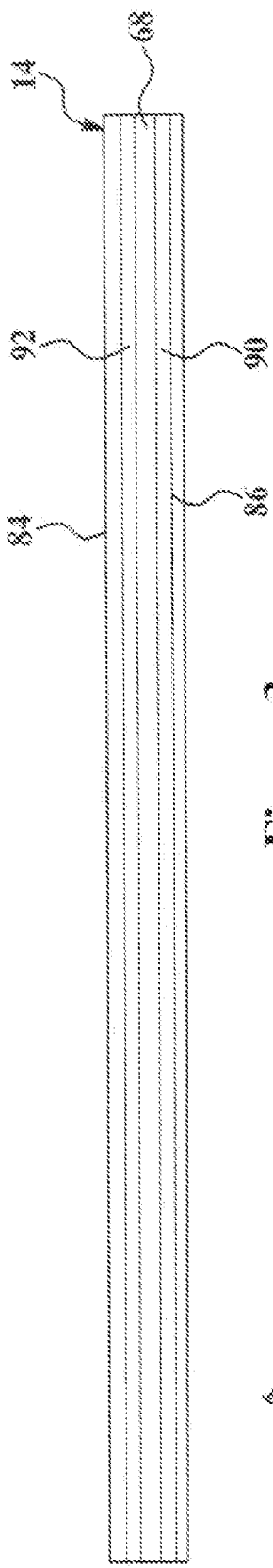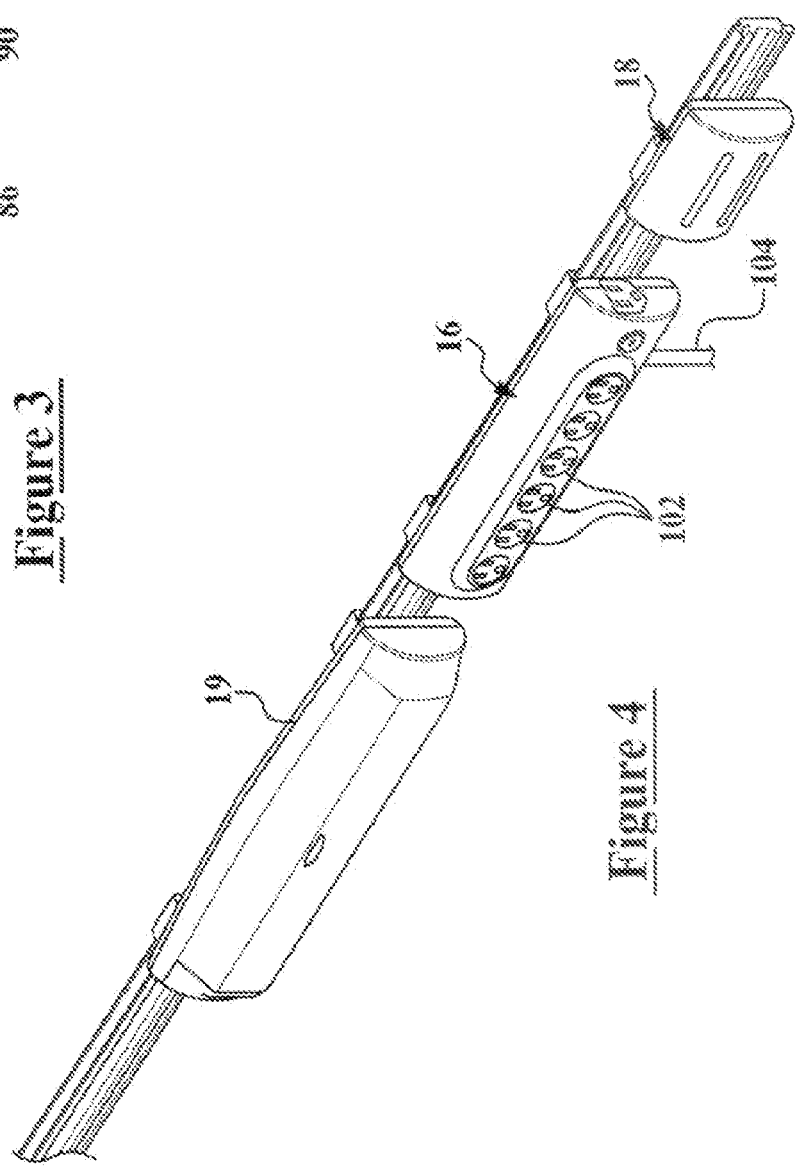

POWER DISTRIBUTION SYSTEM AND A METHOD FOR ASSEMBLING THE POWER DISTRIBUTION SYSTEM

CROSS REFERENCE TO RELATED APPLICATIONS

This application claims the benefit of U.S. Provisional Patent Application Ser. No. 60/681,737, filed May 17, 2005, the contents of which are incorporated herein by reference thereto.

TECHNICAL FIELD

This application relates to a power distribution system and a method for assembling the power distribution system.

BACKGROUND

Workbenches are widely utilized in garages to hold equipment, such as radios and lights for example. A problem associated with this approach is the workbenches become cluttered with equipment. Further, some of the equipment is powered with an AC voltage and other equipment is powered with a DC voltage. As a result, a plurality of electrical wires connected to the equipment are further disposed on the workbench leading to additional clutter.

Accordingly, the inventors herein have recognized a need for a wall mounted power distribution system that can reduce and/or eliminate the above identified problem.

SUMMARY

A power distribution system in accordance with an exemplary embodiment is provided. The power distribution system includes a first mounting member having first and second sides. The first side is configured to be disposed against a wall. The power distribution system further includes a first power distribution member having third and fourth sides. The first power distribution member is configured to be coupled to the first mounting member such that the third side is adjacent the second side. The first power distribution member has first and second electrical leads extending along the fourth side in a spaced relationship from one another. The power distribution system further includes an AC power strip configured to be coupled to the first mounting member such that the AC power strip is disposed adjacent the fourth side of the first power distribution member. The AC power strip has first and second electrical terminals configured to supply an AC voltage. The power distribution system further includes an AC/DC converter configured to be coupled to the first mounting member such that the AC/DC converter is disposed adjacent the first power distribution member. The AC/DC converter has third and fourth electrical terminals and fifth and sixth electrical terminals. The third and fourth electrical terminals are configured to be electrically coupled to the first and second electrical terminals, respectively, of the AC power strip. The fifth and sixth electrical terminals are configured to be electrically coupled to the first and second electrical leads, respectively, of the first power distribution member. The fifth and sixth electrical terminals supply a DC voltage to the first and second electrical leads. The power distribution system further includes a first device configured to be coupled to the first mounting member such that the first device is disposed adjacent the first power distribution member. The first device is electrically connected to the first and second electrical leads and receiving the DC voltage from the first and second electrical leads.

A method for assembling a power distribution system in accordance with an exemplary embodiment is provided. The method includes mounting a first mounting member to a wall. The first mounting member has first and second sides. The first side is disposed against the wall. The method further includes coupling a first power distribution member to the mounting member. The first power distribution member has third and fourth sides. The third side is disposed adjacent the second side of the mounting member. The power distribution member has first and second electrical leads extending along the fourth side in a spaced relationship from one another. The method further includes coupling an AC power strip to the first mounting member such that the AC power strip is disposed adjacent the fourth side of the first power distribution member. The AC power strip has first and second electrical terminals configured to supply an AC voltage. The method further includes coupling an AC/DC converter to the first mounting member such that the AC/DC converter is disposed adjacent the fourth side of the first power distribution member. The AC/DC converter has third and fourth electrical terminals and fifth and sixth terminals. The third and fourth electrical terminals are configured to be electrically coupled to the first and second electrical terminals, respectively, of the AC power strip. The fifth and sixth electrical terminals are configured to be electrically coupled to the first and second electrical leads, respectively, of the first power distribution member. The fifth and sixth electrical terminals supply a DC voltage to the first and second electrical leads. The method further includes coupling a first device to the first mounting member such that the first device is disposed adjacent the first power distribution member. The first device is electrically connected to the first and second electrical leads and receiving the DC voltage from the first and second electrical leads.

BRIEF DESCRIPTION OF THE DRAWINGS

FIG. 3 is a schematic of a power distribution member utilized in the power distribution system of FIG. 1;

FIG. 4 is an enlarged schematic of a portion of the power distribution system of FIG. 1;

DETAILED DESCRIPTION OF EXEMPLARY EMBODIMENTS

Figure 1:
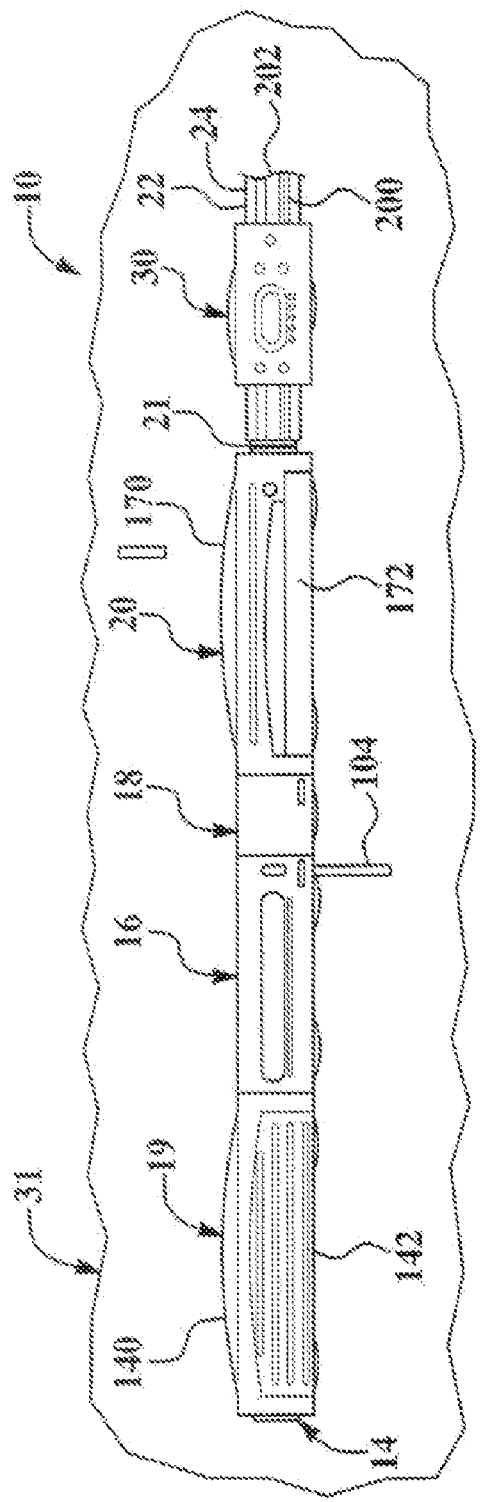
FIG. 1 is a schematic of a power distribution system in accordance with an exemplar embodiment.

Referring to FIG. 1, a power distribution system 10 for providing an AC electrical voltage and a DC electrical voltage is illustrated. The power distribution system 10 is configured to be mounted on a wall 31. The power distribution system 10 includes a mounting member 12, a power distribution member 14, an AC power strip 16, an AC/DC converter 18, a storage module 19, a light emitting module 20, an interconnector device 21, a mounting member 22, a power distribution member 24, a light emitting module 28, and a radio 30.

Figure 2:
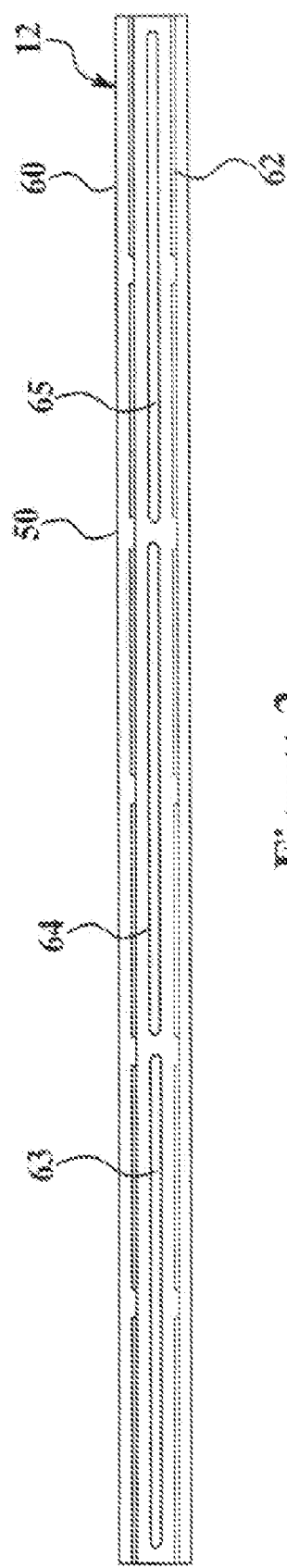
FIG. 2 is a schematic of a mounting member utilized in the power distribution system of FIG. 1.
Figure 5:
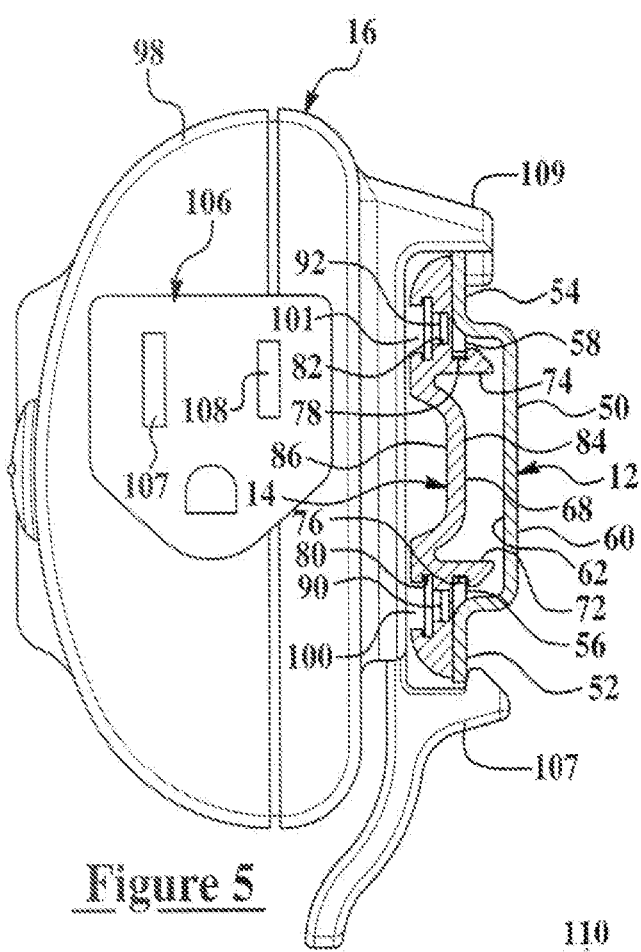
FIG. 5 is a cross sectional schematic of an AC power strip, a mounting member, and a power distribution member utilized in a power distribution system of FIG. 1.

Referring to FIGS. 2 and 5, the mounting member 12 is provided to be mounted on the wall 31 and to hold the power distribution member 14, the AC power strip 16, the AC/DC converter 18, the storage module 10, and the light emitting module 20 thereon. The mounting member 12 includes an elongated plate 50, flange portions 52, 54, and tab portions 56, 58. The elongated plate 50 and the flange portions 52, 54 define a side 60 and a side 62 opposite side 60. The flange portions 52, 54 are disposed opposite one another on the elongated plate 50. The elongated plate 50 has apertures 63, 64 and 65 extending therethrough for allowing fastening devices such as screws to be disposed therethrough for fastening the mounting member 12 to the wall 31.

Referring to FIGS. 3 and 5, the power distribution member 14 is provided to be removably coupled to the mounting member 12. Further, the power distribution member 14 is provided to supply a DC voltage to the various devices electrically coupled to the power distribution member 14. The power distribution member 14 includes an elongated plate 68 and side portions 72, 74 that define a side 84 and a side 86 opposite the side 84. The side portions 72, 74 are disposed opposite one another on the elongated plate 68. The side portion 72 includes a groove 76 for receiving the tab portion 56 of the mounting member 12 therein. Similarly, the side portion 74 includes a groove 78 for receiving the tab portion 58 of the mounting member 12 therein. The side portion 72 further includes a groove 80 extending therein and side portion 74 further includes a groove 82 therein. The electrical leads 90, 92 are disposed within the grooves 80, 82, respectively. The electrical leads 90, 92 are constructed from a conductive metal or metal alloy.

Referring to FIGS. 4 and 5, the AC power strip 16 is provided to supply an AC voltage to a plurality of other devices including the AC/DC converter 18. Further, the AC power strip 16 is configured to be removably coupled to the mounting member 12. The AC power strip includes a housing 98, tab portions 100, 101, attachment portions 107, 109 and two other attachment portions (not shown), AC electrical outlets 102, a power cord 104, and an AC electrical outlet 106. The housing 98 is provided to hold the other components of the AC power strip 16 therein. The tab portions 100, 101 extend from a rear surface of the housing 98 and are configured to contact the side portions 72, 74, respectively of the power distribution member 14. The AC electrical outlets 102 are coupled to a front surface of the housing 98 and are provided to allow a user to plug in a plurality of other devices to power the devices. The AC electrical outlet 106 is disposed on a side surface of the housing 98 and is provided to be electrically coupled to the AC/DC converter 18. The power cord 104 is electrically coupled to the AC electrical outlets 102 and to the AC electrical outlet 106 for supplying an AC voltage thereto. The attachment portions 107 and 109 extend from a rear surface of the housing 98 and are configured to be removably coupled to the flange portions 52, 54, respectively, of the mounting member 12.

Figure 6:
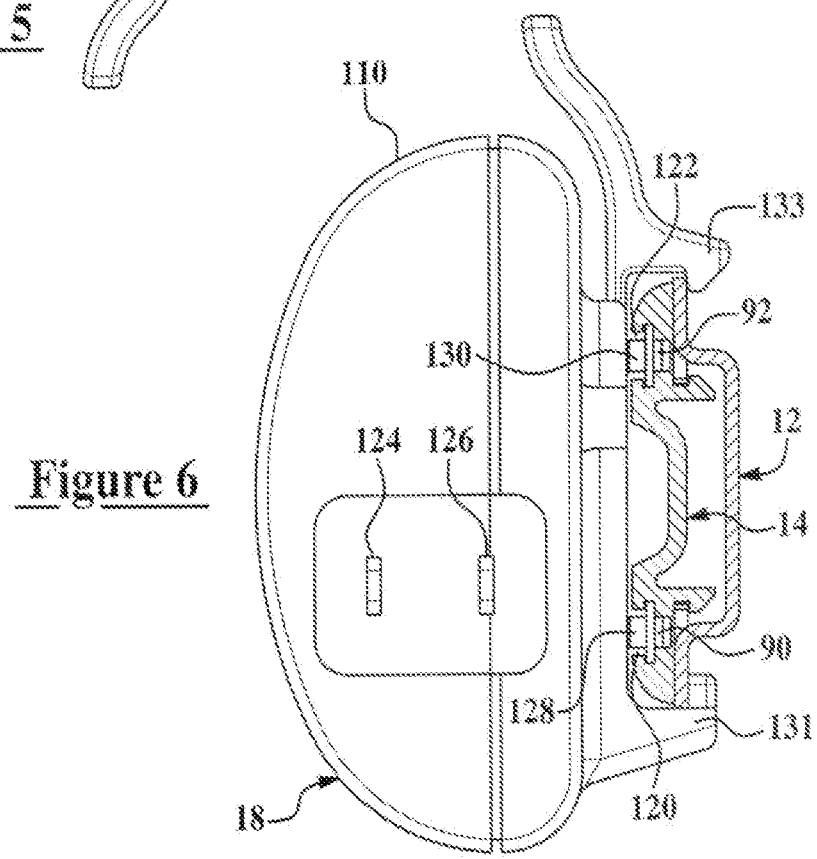
FIG. 6 is a cross-sectional schematic of an AC/DC converter, a mounting member and a power distribution member utilized in the power distribution system of FIG. 1.

Referring to FIGS. 4 and 6, the AC/DC converter 18 is provided to be electrically coupled to the AC power strip 16 and to generate a DC voltage on electrical terminals 128, 130. Further, the AC/DC converter 18 is configured to be removably coupled to the mounting member 12. The AC/DC converter 18 includes a housing 110, tab portions 120, 122, attachment portions 131, 133 and two other attachment portions not shown, AC electrical terminals 124, 126, and DC electrical terminals 128, 130. The housing 110 is provided to hold electronic circuitry (not shown) for converting a received AC voltage to a DC voltage. For example, 110 VAC can be converted to 12 VDC. The internal electronic circuitry is electrically coupled between the AC electrical terminals 124, 126 and the DC electrical terminals 128, 130. The tab portions 120, 122 extend from a rear surface of the housing 110 and are configured to be contact the side portions 72, 74, respectively of the power distribution member 14. The attachment portions 131, 133 and extend from a rear surface of the housing 110 and are configured to be removably coupled to the flange portions 52, 54, respectively, of the mounting member 12. The AC electrical terminals 124, 126 are disposed of side surface of the AC/DC converter 18 such that the terminals 124, 126 are received within the electrical terminals 107, 108 of the AC electrical outlet 104 of the AC power strip 16. The DC electrical terminals 128, 130 are disposed within the tab portions 120, 122, respectively and are electrically coupled to the electrical leads 90, 92 of the power distribution member 14. Thus, a DC voltage generated by internal circuitry of the AC/DC converter 18 is supplied by the electrical terminals 128, 132 and to the electrical leads 90, 92 respectively, of the power distribution member 14 contacting the electrical terminals 128, 132 respectively.

Figure 7:
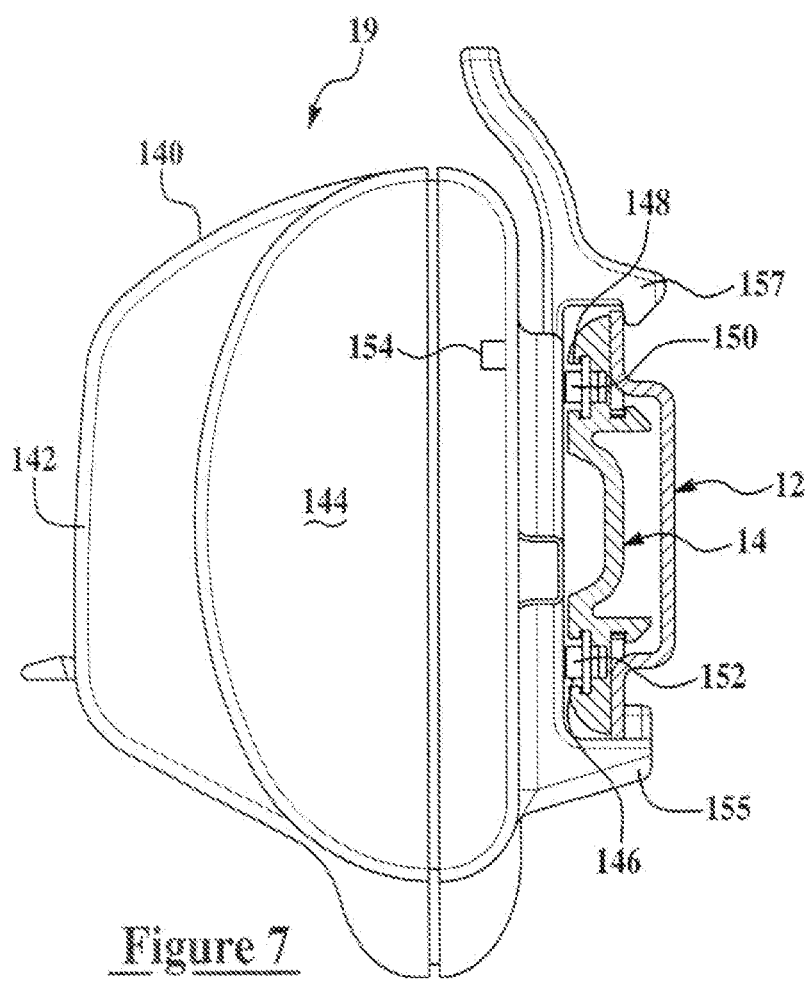
FIG. 7 is a cross-sectional schematic of a storage module, a mounting member, and a power distribution member utilized in the power distribution system of FIG. 1.

Referring to FIG. 7, the storage module 19 is provided to be removably coupled to the mounting member 12. Further, the storage module 19 is provided to hold items within a region 144 of the storage module 19 and to emit light such that the items can be easily seen by a user. The storage module 19 includes a housing 140, a door 142, tab portions 146, 148, attachment portions 155, 157 and two other attachment portions not shown, DC electrical terminals 150, 152, a light emitting device 154. The housing 140 is provided to hold the remaining components of the storage module 19 therein. The door 142 is provided to allow a user to open the door 142 to access the region 144 for storing items in the region 144. The tab portions 146, 448 extend from a rear surface of the housing 140 and are configured to contact the side portions 72, 74, respectively of the power distribution member 14. The attachment portions 155 and 157 extend from a rear surface of the housing 140 and are configured to be removably coupled to the flange portions 52, 54, respectively, of the mounting member 12. The DC electrical terminals 150, 152 are disposed within the tab portions 146, 148, respectively, and are electrically coupled to the electrical leads 90, 92 of the power distribution member 14. The DC electrical terminals 150, 152 are further electrically coupled to the light emitting device 154. Thus, a DC voltage received by the DC electrical terminals 150, 152 induce the light emitting device 154 to emit light.

Referring to FIG. 1, the light emitting module 20 is provided to be physically and electrically coupled to the power distribution member 14. Further, the light emitting module 20 is provided the emit light therefrom. The light emitting module 20 includes a housing 170, two tab portions (not shown) that are similar to the tab portions 146, 148, four attachment portions (not shown), a light emitting device 172, and DC electrical terminals (not shown) that are similar to DC electrical terminals 150, 152. The housing 170 is provided to hold the remaining components of the light emitting module 20. Two tab portions extend from a rear surface of the housing 170 and are configured to be contact side portions 72, 74, respectively of the power distribution member 14. The four attachment portions (not shown)

extend from a rear surface of the housing 140 and are configured to be removably coupled to the flange portions 52, 54, respectively, of the mounting member 12. Two DC electrical terminals are disposed within the tab portions and are electrically coupled to the electrical leads 90, 92 of the power distribution member 14. Thus, a DC voltage received by the DC electrical terminals induce the light emitting device 154 to emit light.

Figure 8:
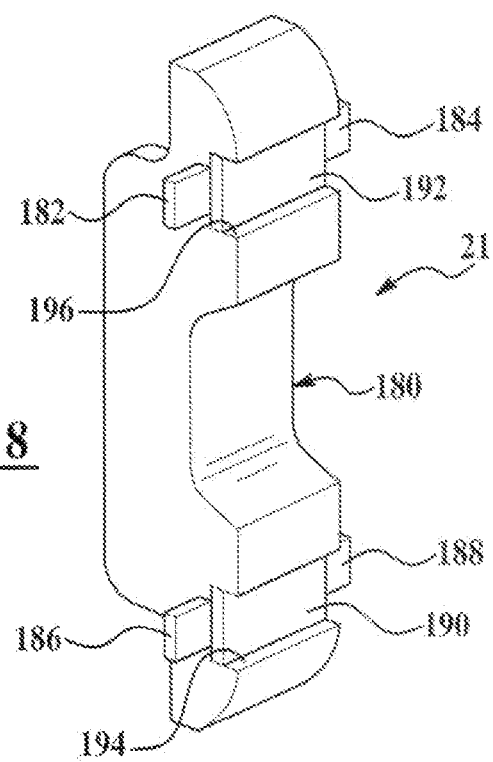
FIG. 8 is a front view of a light emitting module utilized in the power distribution system of FIG. 1.

Referring to FIGS. 1 and 8, the interconnector device 41 is provided to electrically couple the power distribution member 14 to a power distribution member 24. Thus, the interconnector device 41 can be utilized to expand the number of devices that can be electrically powered by the power distribution system 10. The interconnector device 21 includes a body portion 180, tab portions 182, 184, 186, 188 and electrical leads 190, 192. The tab portions 182, 186 extend from a first side of the body portion 180 and are configured to hold the body portion 180 against the combination of the mounting member 12 and the power distribution member 14. The tab portions 184, 188 extend from a second side of the body portion 180 and are configured to hold the body portion 180 against the combination of the mounting member 22 and the power distribution member 24. The electrical leads 190, 192 disposed within grooves 194, 196, respectively of the body portion 180. The electrical lead 190 is provided to electrically couple the electrical lead 90 of the power distribution member 14 to an electrical lead 200 of the power distribution member 24. Further, the electrical lead 192 is provided electrically couple the electrical lead 92 of the power distribution member 14 to an electrical lead 202 of the power distribution member 24.

Referring to FIG. 1, a mounting member 22 is provided to be mounted on the wall 31 and to hold the power distribution member 24 thereon. The mounting member 22 has a substantially similar design as the mounting member 12.

The power distribution member 24 is provided to be coupled to the mounting member 22. Further, the power distribution member 24 is provided to supply a DC voltage to the various devices electrically coupled to the mounting member 12. The power distribution member 24 includes electrical leads 200, 202 disposed on an elongated plate and has a substantially similar design as the power distribution member 14.

The radio 30 is provided to allow a user to listen to various radio programs. The radio 30 is configured to be physically coupled to the power distribution member 14 in a similar manner as the light emitting module 20. The radio includes a housing 210 and tab portions (coupled to the housing 210) which are configured to couple the housing 210 to the power distribution member 24.

Referring to FIG. 1, a method for assembling a portion of the power distribution system 10 in accordance with another exemplary embodiment will now be explained.

At a first step, the mounting member 12 is mounted to the wall 31 utilizing screws. The mounting member 12 has sides 60, 62. The side 60 is disposed against the wall 31.

At a second step, the power distribution member 14 is coupled to the mounting member 12. The power distribution member 14 has sides 84, 86. The side 84 is configured to be coupled to the side 62 of the mounting member 12. The power distribution member has electrical leads 90, 92 extending along the side 86 in a spaced relationship from one another.

At a third step, the AC power strip 16 is coupled to the mounting member 12 such that the AC power strip 16 is disposed adjacent the side 86 of the power distribution member 14. The AC power strip 16 has electrical terminals 106, 108 configured to supply an AC voltage.

At a fourth step, the AC/DC converter 18 is coupled to the mounting member 12 such that the AC/DC converter is disposed adjacent the side 86 of the power distribution member 14. The AC/DC converter 18 has AC electrical terminals 124, 126 and DC electrical terminals 128, 130. The AC electrical terminals 124, 126 are configured to be electrically coupled to the AC electrical terminals 107, 108, respectively, of the AC power strip. The DC electrical terminals 128, 130 are configured to be electrically coupled to the electrical leads 90, 92, respectively, of the power distribution member 14. The DC electrical terminals 128, 130 supply a DC voltage to the electrical leads 90, 92.

At a fifth step, the storage module 19 is coupled to the mounting member 12 such that the storage module 19 is disposed adjacent the side 86 of the power distribution member. The storage module 19 is electrically connected to the electrical leads 90, 92 and received the DC voltage from the electrical leads 90, 92.

At a sixth step, the light emitting module 28 is coupled to the mounting member 12 such that the light emitting module 28 is disposed adjacent the power distribution member 14. The light emitting module 28 is electrically connected to the electrical leads 90, 92 and receive the DC voltage from the electrical leads 90, 92.

At a seventh step, the interconnector device 21 is mounted to the combination of the mounting member 12 and the power distribution member 14 such that the electrical leads 190, 192 are electrically coupled to the electrical leads 90, 92, respectively.

At an eighth step, the mounting member 22 is mounted to the wall 31 utilizing screws.

At a ninth step, the power distribution member 24 is physically coupled to the mounting member 22, such that the electrical leads 190, 192 are electrically coupled to the electrical leads 200, 202, respectively of the power distribution member 24.

Finally, at a tenth step, the radio 30 is physically coupled to the mounting member such that the radio 30 is disposed adjacent the power distribution member 24. The radio 30 is electrically coupled to the electrical leads 200, 202 and receive the DC voltage therefrom.

The power distribution system 10 provides a substantial advantage over other systems. In particular, the power distribution system 10 provides a technical effect of holding a plurality of devices thereon and supplying either an AC voltage or a DC voltage to the devices.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A power distribution system, comprising:
   a first mounting member having first and second sides, the first side being configured to be disposed against a wall;
   a first power distribution member having third and fourth sides, the first power distribution member configured to be coupled to the first mounting member such that the third side is adjacent the second side, the first power distribution member having first and second electrical leads extending along the fourth side in a spaced relationship from one another;
   an AC power strip configured to be coupled to the first mounting member such that the AC power strip is disposed adjacent the fourth side of the first power distribution member, the AC power strip having first and second electrical terminals configured to supply an AC voltage;
   an AC/DC converter configured to be coupled to the first mounting member such that the AC/DC converter is disposed adjacent the first power distribution member, the AC/DC converter having third and fourth electrical terminals and fifth and sixth electrical terminals, the third and fourth electrical terminals configured to be electrically coupled to the first and second electrical terminals, respectively, of the AC power strip, the fifth and sixth electrical terminals configured to be electrically coupled to the first and second electrical leads, respectively, of the first power distribution member, the fifth and sixth electrical terminals supplying a DC voltage to the first and second electrical leads; and
   a first device configured to be coupled to the first mounting member such that the first device is disposed adjacent the first power distribution member, the first device being electrically connected to the first and second electrical leads and receiving the DC voltage from the first and second electrical leads.

2. The power distribution system of claim 1, wherein the AC power strip includes a plurality of electrical outlets, each electrical outlet of the plurality of electrical outlets being adapted to receive a three terminal electrical plug.

3. The power distribution system of claim 1, wherein the first device comprises a storage module having a housing for storing articles, a light emitting device disposed in the housing, and seventh and eighth electrical terminals electrically coupled to the light emitting device, the seventh and eighth electrical terminals being further electrically coupled to the first and second electrical leads, the light emitting device emitting light in response to the DC voltage.

4. The power distribution system of claim 1, wherein the first device comprises a light emitting module having a housing, a light emitting device disposed on the housing, and seventh and eighth electrical terminals electrically coupled to the light emitting device, the seventh and eighth electrical terminals being further electrically coupled to the first and second electrical leads, the light emitting device emitting light in response to the DC voltage.

5. The power distribution system of claim 1, wherein the first device comprises a radio having seventh and eighth electrical terminals electrically coupled to the first and second electrical leads, the radio being operational in response to the DC voltage.

6. The power distribution system of claim 1, further comprising a second device configured to be couple to the power distribution member, the second device being electrically connected to the first and second electrical leads and receiving the DC voltage from the first and second electrical leads.

7. The power distribution system of claim 1, further comprising:
   an electrical coupler device having third and fourth electrical leads, the third and fourth electrical leads configured to be electrically coupled to the first and second electrical leads of the first power distribution member;
   a second mounting member having fifth and sixth sides, the fifth side being configured to be disposed against the wall proximate the electrical coupler device;
   a second power distribution member having seventh and eighth sides, the second power distribution member configured to be coupled to the second mounting member such that the seventh side is adjacent the sixth side, the second power distribution member having fifth and sixth electrical leads extending along the eighth side in a spaced relationship to one another, the fifth and sixth electrical leads configured to be electrically connected to the third and fourth electrical leads, respectively.

8. A method for assembling a power distribution system, comprising:
   mounting a first mounting member to a wall, the first mounting member having first and second sides, the first side being disposed against the wall;
   coupling a first power distribution member to the mounting member, the first power distribution member having third and fourth sides, the third side being disposed adjacent the second side of the mounting member, the power distribution member having first and second electrical leads extending along the fourth side in a spaced relationship from one another;
   coupling an AC power strip to the first mounting member such that the AC power strip is disposed adjacent the fourth side of the first power distribution member, the AC power strip having first and second electrical terminals configured to supply an AC voltage;
   coupling an AC/DC converter to the first mounting member such that the AC/DC converter is disposed adjacent the fourth side of the first power distribution member, the AC/DC converter having third and fourth electrical terminals and fifth and sixth terminals, the third and fourth electrical terminals configured to be electrically coupled to the first and second electrical terminals, respectively, of the AC power strip, the fifth and sixth electrical terminals configured to be electrically coupled to the first and second electrical leads, respectively, of the first power distribution member, the fifth and sixth electrical terminals supplying a DC voltage to the first and second electrical leads; and
   coupling a first device to the first mounting member such that the first device is disposed adjacent the first power distribution member, the first device being electrically connected to the first and second electrical leads and receiving the DC voltage from the first and second electrical leads.

9. The method of claim 8, further comprising coupling a second device to the first mounting member such that the second device is disposed adjacent the first power distribution member, the second device being electrically connected to the first and second electrical leads and receiving the DC voltage from the first and second electrical leads.

* * * * *